(No Model.)
L. NELSON.
WELL DRILLING MACHINE.
No. 307,572. Patented Nov. 4, 1884.
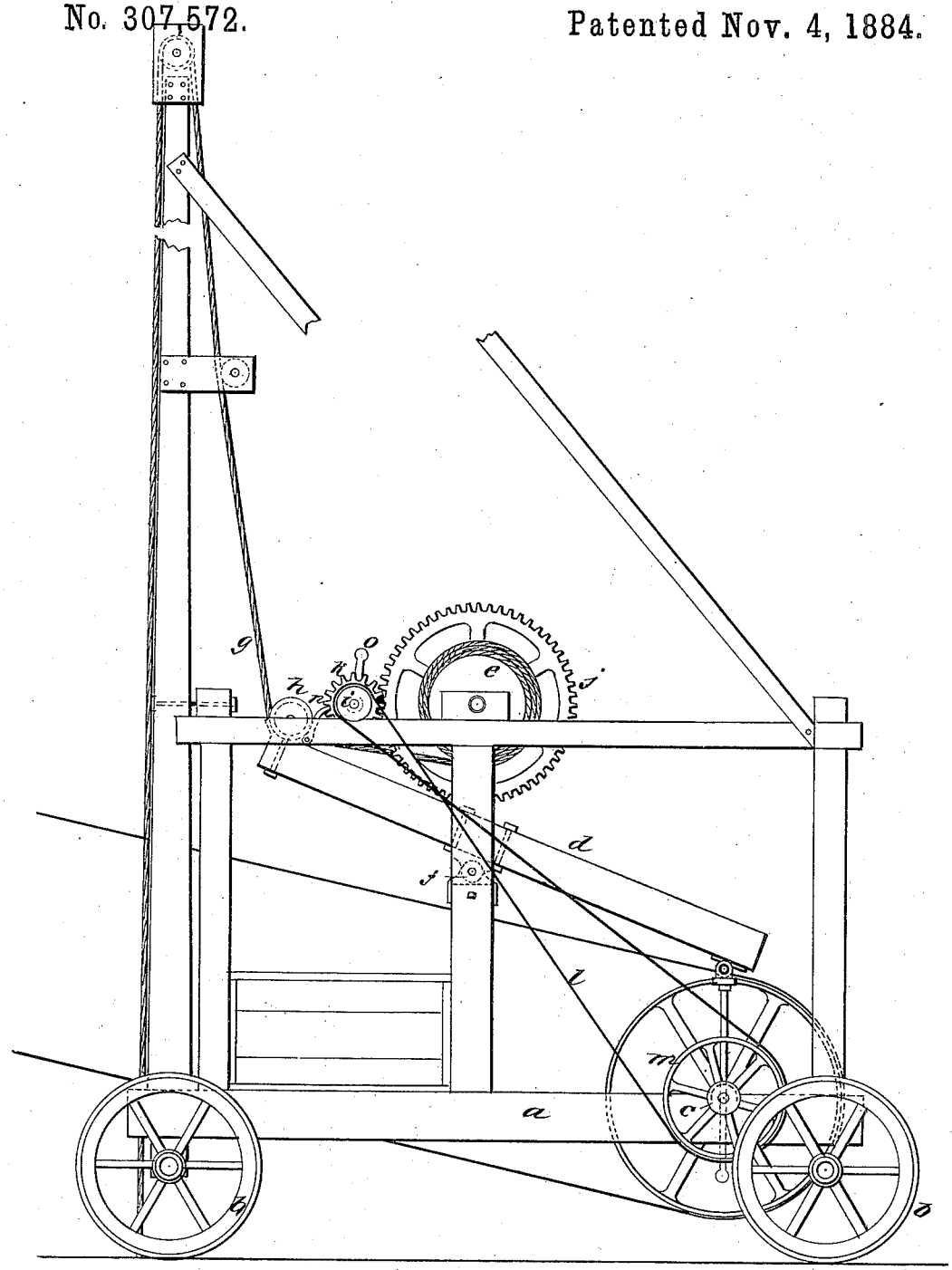
WITNESSES:
Francis McArdle
C. Sedgwick
INVENTOR:
L. Nelson
BY Munn & Co.
ATTORNEYS.

UNITED STATES PATENT OFFICE.

LYCURGUS NELSON, OF FLORENCE, TENNESSEE.

WELL-DRILLING MACHINE.

SPECIFICATION forming part of Letters Patent No. 307,572, dated November 4, 1884.

Application filed May 16, 1884. (No model.)

*To all whom it may concern:*

Be it known that I, LYCURGUS NELSON, of Florence, in the county of Rutherford and State of Tennessee, have invented a new and Improved Well-Drilling Machine, of which the following is a full, clear, and exact description.

My invention relates to improvements in rock-drilling machines; and it consists in the peculiar construction and arrangement of parts, as hereinafter fully described, and pointed out in the claims.

Reference is to be had to the accompanying drawing, forming part of this specification, and which is a side elevation of my improved machine.

I mount the bed-frame $a$ of the machine on wheels $b$ for portability, using low wheels for affording sufficient stability for working the machine on them to avoid the labor and expense of frequently loading and unloading the machine, and in order to make the machine practically operative on said wheels I mount the driving-shaft $c$ on the sills of the bed-frame, which enables me to locate the walking-beam $d$ at a point only a little above the bed-frame, and thus lessen the height of the machine to an extent rendering it satisfactorily operative on the truck employed for transporting it. I locate the reel $e$ directly over the pivot $f$ of the walking-beam $d$, and run the drill-rope $g$ from under said reel along over the beam to the sheave $h$, and gear the reel with a driving-shaft, $i$, by means of wheel $j$ and pinion $k$, for driving it by the crossed belt $l$ to raise the drill when the pulley $m$ is clutched with the main driving-shaft $c$.

In order to feed the drill directly from the reel $e$, I have applied the hand-crank $o$ to the shaft $i$, and the stop-pawl $n$ to the pinion $k$, for shifting and setting it to feed the drill.

It will be seen that by the arrangements above described the machine is made more compact and convenient for transportation, also more economical, and very simple and efficient as to the feeding arrangement.

Having thus fully described my invention, I claim as new and desire to secure by Letters Patent—

1. In a rock-drill, the combination, with the driving-shaft $c$, the walking-beam $d$, and the sheave $h$, of the reel $e$, located above the pivot of the walking-beam, the gear-wheel $j$, the pinion $k$, the belt $l$, and pawl $n$, substantially as herein shown and described.

2. In a rock-drill, the combination, with the frame $a$, mounted on wheels $b$, of the drive-shaft $c$, the walking-beam $d$, the sheave $h$, the belt $l$, the pinion $k$, the shaft $i$, provided with crank-handle $o'$, the gear-wheel $j$, and the reel $e$, substantially as herein shown and described.

LYCURGUS NELSON.

Witnesses:
D. P. CALDWELL,
J. F. McDARNELL.